United States Patent
Hennig et al.

[15] 3,695,734
[45] Oct. 3, 1972

[54] ANTI-WHEEL SLIDE APPARATUS FOR VEHICLES

[72] Inventors: Karl-Friedrich Hennig, Ricklingen; Erich Reinecke, Beinhorn; Herbert Merz, Hannover; Egon Werner, Bordenau; Fritz Isernhagen, Letter; Erwin Holthusen, Berenbostel; Alfred Klatt, Wettbergen, all of Germany

[73] Assignee: Westinghouse Bremsen und Apparatebau G.m.b.H., Hannover, Germany

[22] Filed: Aug. 3, 1970

[21] Appl. No.: 60,286

[30] Foreign Application Priority Data
Sept. 15, 1969  Germany..........P 19 46 635.4

[52] U.S. Cl. ...................303/21 F, 303/61, 303/68
[51] Int. Cl. .............................................B60t 8/10
[58] Field of Search ........188/181; 303/6, 10, 20, 21, 303/61, 68

[56] References Cited

UNITED STATES PATENTS

| | | |
|---|---|---|
| 3,514,161 | 5/1970 | Frayer....................303/10 X |
| 3,544,171 | 12/1970 | Lester et al...............303/21 F |
| 3,449,019 | 6/1969 | Walker.....................303/21 F |
| 3,286,734 | 11/1966 | Hartshorne...........303/21 F X |
| 3,536,362 | 10/1970 | Davis........................303/21 F |
| 3,286,271 | 8/1966 | Yackle.....................303/21 F |
| 3,586,386 | 6/1971 | Trocme....................303/21 F |

Primary Examiner—Milton Buchler
Assistant Examiner—Stephen G. Kunin
Attorney—Ralph W. McIntire, Jr.

[57] ABSTRACT

Apparatus for preventing vehicle wheel-slide during braking operations by detecting occurrence of wheel-slip and responding to such wheel-slip at a degree short of wheel-lock or slide, said degree being determined by the condition of the road surface, for effecting, in timed cycles, reduction and reapplication of brake-applying pressure, the degree of said reduction and reapplication of brake-applying pressure varying according to variance in road conditions, until the vehicle is brought to a stop or to the desired state of retardation.

10 Claims, 4 Drawing Figures

3,695,734

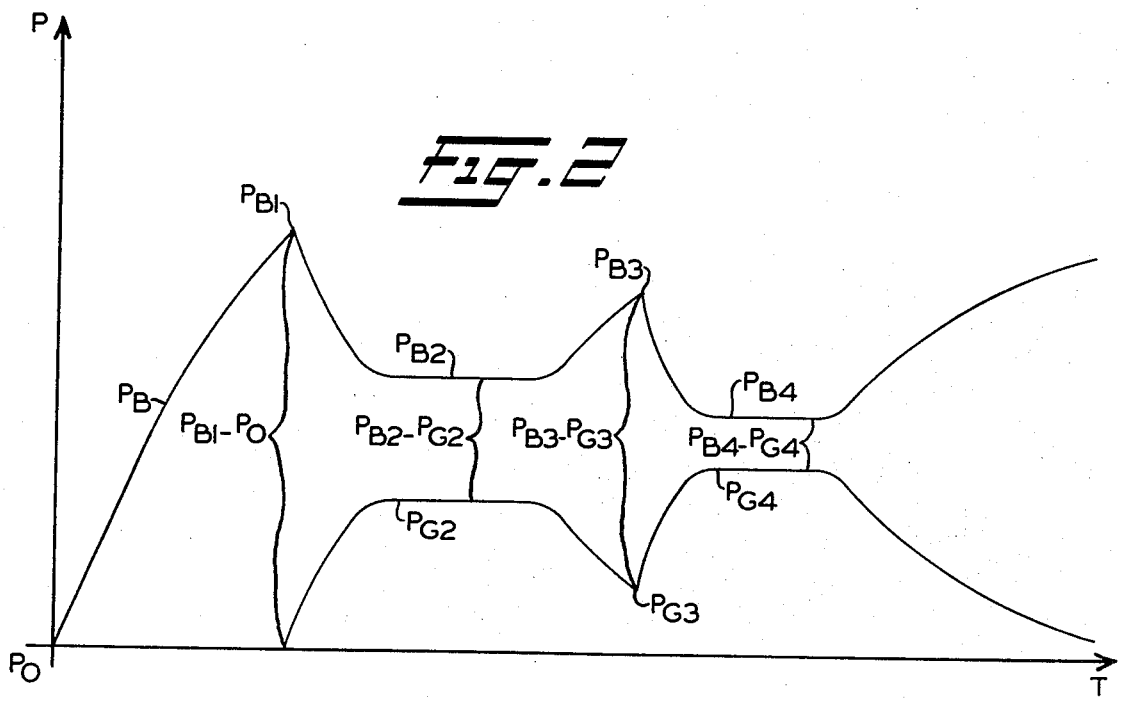
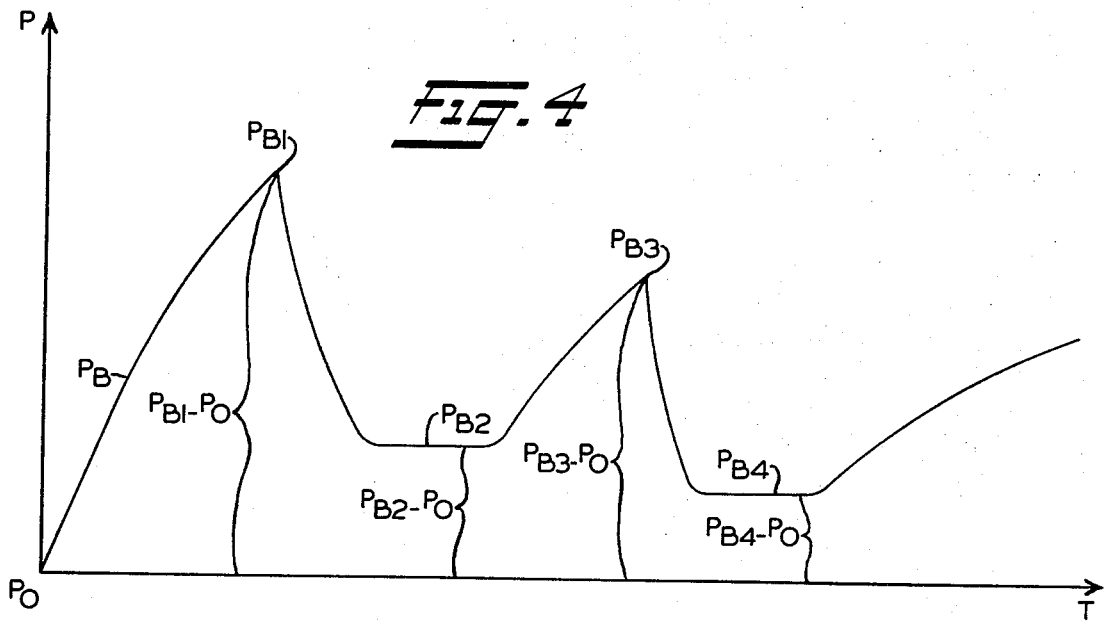

ANTI-WHEEL SLIDE APPARATUS FOR VEHICLES

BACKGROUND OF INVENTION

As is known to those skilled in the art, overbraking of a rotating vehicle wheel, particularly under adverse tire and road conditions, can result in undesirable wheel-slip or wheel-slide.

For purposes of this disclosure, wheel-slip is defined as that condition wherein the rate of angular deceleration of a rotating wheel, due to retarding forces applied thereto, is inconsistent with the rate of linear deceleration of the vehicle, whereas wheel-slide or wheel-skid is defined as that condition wherein, due to excessive retarding forces applied thereto, the wheel is dragged along the road surface in a locked state.

In order to neutralize wheel-slip an thereby prevent possible wheel-slide resulting therefrom when a brake application is in effect, the retarding forces acting on the wheel must be sufficiently reduced to permit the wheel to regain a rate of rotation compatible or synchronous with linear velocity of the vehicle. Upon attainment of synchronization between angular deceleration of the wheel and linear deceleration of the vehicle, the braking forces may be reapplied.

SUMMARY OF INVENTION

The object of the present invention, therefore, is to provide anti-wheel slide apparatus operable for detecting wheel-slip at its inception and, in response thereto, for automatically effecting, in cycling manner, a reduction of the brake-applying force to permit the wheel to resume normal rotation and, upon expiration of a predetermined time interval, for restoring the brake-applying force, whereby stopping or desired retardation of the vehicle is accomplished in a minimum distance.

Briefly the invention comprises a differential piston-valve device interposed in the line supplying operating pressurized fluid to the brake cylinder, and a wheel-slip detector of conventional type operable responsively to wheel-slip at a degree short of wheel-slide, during braking operations, for effecting operation of said piston valve device to momentarily release the brake application and permit the wheel to resume normal rotation and, upon expiration of a predetermined time interval, to restore brake-applying pressure to the wheel. If wheel-slip persists, the apparatus embodying the invention is operable, in cycling fashion, for repeating the release and reapplication cycle of brake-applying as often as is necessary until the vehicle is brought to a stop, the degree of brake-applying pressure reduction and reapplication being determined by the existing tire and road conditions with each cycle of operation of the apparatus.

The apparatus above described may be used with a double-acting brake cylinder by providing opposing pressure of different degrees on opposite sides of the brake cylinder piston, so that the differential pressure therebetween is the effective brake cylinder actuating pressure, or by use of a modified differential piston-valve device, the apparatus is adaptable to a single-acting brake cylinder by controlling the degree of pressure on the one side only of the brake cylinder piston.

In the drawings,

FIG. 2 is a graphical representation of a time-pressure relationship characteristic of the apparatus shown in FIG. 1;

FIG. 4 is a graphical representation of a time-pressure relationship characteristic of the apparatus shown in FIG. 3.

DESCRIPTION AND OPERATION

Figure 1:
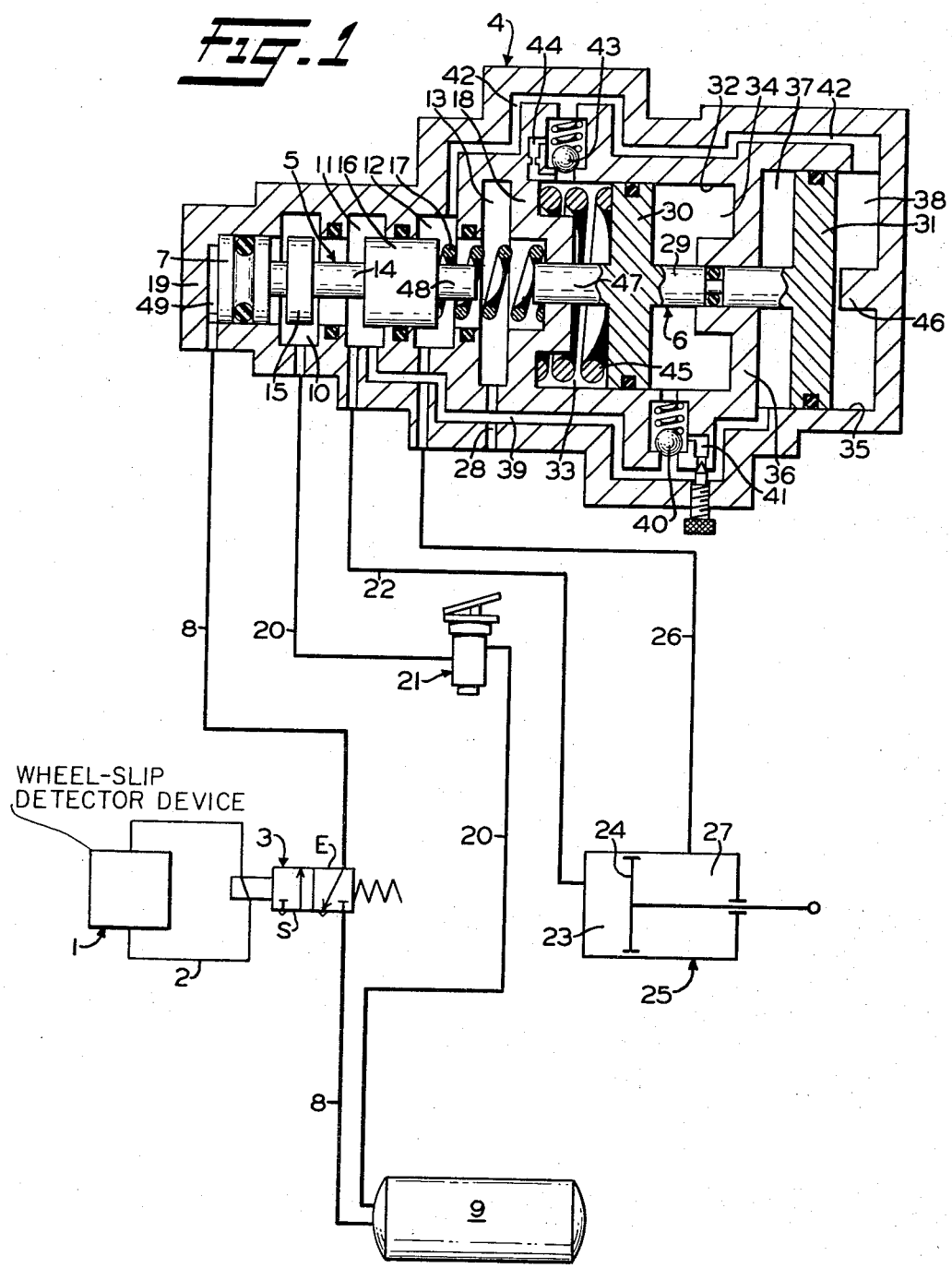
FIG. 1 is a schematic view, with the differential piston-valve device shown in section, of the anti-wheel slide apparatus embodying the invention.

The anti-wheel slide apparatus illustrated in FIG. 1 comprises a conventional type (such as a rotary inertia operable type) wheel-slip detector device 1 operable responsively to a predetermined critical degree of wheel-slip short of wheel-slide for closing an electrical circuit 2 and thereby effecting energization of a magnet valve device 3, and being operable responsively to termination of the wheel-slip condition for opening said circuit and deenergizing said magnet valve device.

A differential piston-valve device 4 comprises a casing for housing a spool type valve assembly 5 in axial alignment with a differential piston assembly 6. The valve assembly 5 is provided, at the end remote from the piston assembly 6, with an operating piston 7 subjectable to fluid pressure supplied via a pipe 8, in which the magnet valve device 3 is interposed, from a reservoir 9. The valve assembly 5 is axially reciprocable for controlling communication between a series of axially spaced chambers comprising a supply pressure chamber 10, a delivery pressure chamber 11, a differential pressure chamber 12, and an atmospheric chamber 13 formed in the casing. A common rod or shaft 14 having the operating piston 7 fixed at one end thereof, also carries a supply valve 15 and a reducing valve 16, said supply valve being axially positioned on said shaft so as to control communication between chambers 10 and 11, and said reducing valve being axially positioned on said shaft so as to control communication between chambers 11, 12, and 13, as will be explained hereinafter.

A spring 17 compressed between an inner separating wall 18 and the end of valve assembly 5 adjacent reducing valve 16, urges said valve assembly in a left-hand direction, as viewed in the drawing, toward a supply position in which the operating piston 7 is in abutting contact with an end wall 19, as shown in the drawing, and in which chamber 10 is in communication with chamber 11, and chamber 12 is in communication with chamber 13, while reducing valve 16 cuts off communication between chambers 11 and 12.

Supply pressure chamber 10 is connected to reservoir 9 via a pipe 20 in which a pedally operated valve device 21 is interposed for controlling supply of fluid under pressure from said reservoir to said chamber and release of fluid pressure therefrom. Delivery pressure chamber 11 is connected via a pipe 22 to a main pressure chamber 23 adjacent one side of a piston 24 of a double-acting brake cylinder device 25, and differential pressure chamber 12 is connected via a pipe 26 to an equalizing chamber 27 adjacent the opposite side of said piston. Atmospheric chamber 13 is open to atmosphere via a passageway 28.

The differential piston assembly 6 comprises a common rod or shaft 29 axially aligned with shaft 14 and on which are axially spaced a first or smaller piston 30 and a second or larger piston 31 larger than said first piston, said first piston being disposed on the end of shaft 29 adjacent separating wall 18. Piston 30 is reciprocably operable in a bore 32 formed in the casing and cooperates with said bore and casing to form on opposite sides of said piston respective cylinder chambers 33 and 34. Piston 31 is reciprocably operable in a bore 35 isolated from bore 32 by a separating wall 36, said piston cooperating with bore 35 and the casing to form on opposite sides of the piston respective cylinder chambers 37 and 38.

A passageway 39 formed in the casing connects delivery pressure chamber 11 with cylinder chamber 37 adjacent the right-hand side, as viewed in the drawing, of separating wall 36. Passageway 39 also connects to cylinder chamber 34 in the opposite side of separating wall 36 by way of a one-way check valve 40 and an adjustable choked passage 41 in bypassing relation to said check valve, the direction of flow of said check valve being from said passageway into said cylinder chamber. The differential pressure chamber 12 is connected via a passageway 42 to cylinder chamber 38 on the right-hand side of piston 31, said passageway also connecting to cylinder chamber 33 on the left-hand side of piston 30 via a one-way check valve 43 and a choke 44 in bypassing relation to said check valve. The direction of flow of check valve 43 is from passageway 42 into cylinder chamber 33.

A spring 45 compressed between separating wall 18 and piston 30 in cylinder chamber 33 urges the piston assembly 6 in a right-hand direction, as viewed in the drawing, toward a retracted position defined by abutting contact of piston 31 with an internal projection 46 formed on the right-hand end wall of the casing. The piston assembly 6 is operable, in a manner to be hereinafter described, to an extended position in which an end portion 47 extending axially from shaft 29 into atmospheric chamber 13 makes abutting contact with end portion 48 extending axially from shaft 14 into said chamber for shifting valve assembly 5 toward its supply position hereinbefore defined.

In describing the operation of the anti-wheel slide apparatus shown in FIG. 1, reference will also be made to the graphical representation shown in FIG. 2 relating to the functional aspects of said apparatus shown in FIG. 1.

With the apparatus in the disposition shown in FIG. 1, actuation of the brake valve 21 effects supply of fluid under pressure from the reservoir 9, via pipe 20, to supply chamber 10 of the differential piston-valve device 4, and since the valve assembly 5 is now held in its supply position by spring 17, said fluid under pressure also flows into chamber 11 and from there, via passageway 39, into cylinder chamber 37 adjacent the left side of the larger piston 31, and past check valve 40 into cylinder chamber 34 adjacent the right side of smaller piston 30. Because of the larger area of piston 31 relative to piston 30, the fluid pressure acting thereon causes the piston assembly 6 to be moved to its retracted position against projection 46. At this time, valve assembly 5 is held in its supply position by spring 17 so that fluid under pressure is also supplied via delivery chamber 11 and pipe 22 to main pressure chamber 23 of the brake cylinder device 25 for initiating a brake application.

Fluid pressure thus supplied to chamber 23 of the brake cylinder device 25 is designated as $P_B$ and shown on the graph in FIG. 2, which relates pressure (P) to time (t), as a continuously rising curve $P_o$–$P_{B1}$. Assuming the tire and road conditions to be such that wheel-slip occurs, the wheel-slip detector 1 responds to the critical degree of said wheel-slip just short of wheel-slide to effect energization of magnet valve 3. Magnet valve 3 is thus operated from an exhaust position, in which it is shown and diagrammatically designated as position E in the drawing and in which an upper section of pipe 8 between said magnet valve and piston-valve device 4 is vented to atmosphere, to a supply position designated as position S and in which communication through pipe 8 is open to permit supply of pressurized fluid from reservoir 9 to a chamber 49 adjacent the left side of operating piston 7 of the valve assembly 5. Responsively to fluid pressure in chamber 49 acting on operating piston 7, valve assembly 5 is shifted from its supply position toward a pressure-reducing position. Initial movement of valve assembly 5 toward its pressure-reducing position first causes supply valve 15 to cut off communication between chambers 10 and 11, and therefore further supply of pressurized fluid to brake cylinder device 25, and further displacement of said valve assembly to said pressure-reducing position effects sufficient movement of reducing valve 16 to establish communication between delivery chamber 11 and differential chamber 12 while, at the same time, closing off atmospheric chamber 13 from said differential chamber.

With the valve assembly 5 in its pressure-reducing position, pressurized fluid prevailing in chamber 23 of brake cylinder device 25 and in chamber 37 of the piston-valve device 4 flows therefrom via pipe 22 and passageway 39, respectively, and via passageway 42 to chamber 38 on the right side of larger piston 31, and also to chamber 33 through choke 44. Moreover, since differential chamber 12 is now open to delivery chamber 11, pressurized fluid from chamber 23 of brake cylinder device 25 and from chamber 37 of piston-valve device 4 also flows via pipe 26 to equalizing chamber 27 of said brake cylinder device. Since fluid pressure in chamber 34, which is equivalent to pressure $P_{B1}$, can escape by way of choke 41 only, such pressure, for the moment, remains at practically the value at which the chamber was originally charged.

As a result of the redistribution of pressurized fluid in chamber 23 of the brake cylinder device 25 and in chamber 37 of the piston-valve device 4, in the manner above described, the original brake-applying pressure $P_{B2}$–$P_o$ is functionally reduced, such reduction continuing until said pressure $P_{B2}$–$P_o$ attains the lesser value designated as $P_{B2}$ in FIG. 2 and which now prevails in main chamber 23 of the brake cylinder device 25. At the same time, counter pressure builds up in equalizing chamber 27 of the brake cylinder device 25 until such counterpressure reaches a terminal value designated as $P_{G2}$ in FIG. 2. For reasons to be presently set forth, the terminal value of pressure $P_{G2}$, that is, the counterpressure now prevailing in chamber 27 of the brake cylinder device 25, is less than the now prevailing reduced pressure in main chamber 23.

Since pressure build-up in chamber 33 occurs at a relatively slow rate determined by choke 44, since pressure in chamber 34 is retained at a relatively high value by choke 41, since pressure in chamber 37 is reduced by redistribution to chamber 38 and to chamber 27 of the brake cylinder device 25, and because of the relative dimensions of pistons 30 and 31, build-up of pressure in chamber 38 (acting in concert with pressure in chamber 34) need progress only to a value sufficient for overcoming the combined opposition of spring 45 and pressures in chambers 33 and 37 for causing the piston assembly 6 to be shifted in a left-hand direction and thereby engage and operate the valve assembly 5 to a lapped position. Displacement of valve assembly 5 to its lapped position is just enough to place reducing valve 16 in a position effective for cutting off communication between delivery chamber 11 and differential chamber 12 while, at the same time, keeping said differential chamber cut off from atmospheric chamber 13, and also to maintain supply valve 5 in position for keeping chambers 10 and 11 cut off from each other. A state of equilibrium thus prevails for the moment. The value of pressure in chamber 38 at which piston assembly 6 is shifted to the left corresponds to pressure $P_{G2}$, the prevailing pressure in chamber 27 of the brake cylinder device 25, which, for reasons above set forth, is less than pressure $P_{B2}$, the prevailing pressure in main chamber 23 of said brake cylinder device. The effective braking pressure, therefore, is the differential pressure between pressures $P_{B2}$ and $P_{G2}$ shown in FIG. 2 as $P_{B2}-P_{G2}$, which remains at a constant level until valve assembly 5 is restored to its supply position, as will presently be described.

Because, in response to occurrence of wheel-slip, and in the manner above described, the braking pressure has been reduced, the vehicle wheel may, for the time being at least, assume normal rotation so that the wheel-slip detector 1 effects deenergization of magnet valve 3 and consequent operation thereof to position E in which the upper section of pipe 8, and therefore chamber 49 of piston-valve device 4, are exhausted to atmosphere. Consequently spring 17 acts to restore valve assembly 5 to its supply position.

With valve assembly 5 restored to its supply position, equalizing chamber 27 of the brake cylinder device 25 and chamber 38 of piston-valve device 4 are vented to atmosphere via pipe 26 and passageway 42, respectively, and via chambers 12 and 13, so that pressure in said chambers begins to dissipate. At the same time, since communication between reservoir 9 and main chamber 23 of brake cylinder device 25 is reestablished, pressure in said main chamber begins building up again.

Assuming, however, that at this point the road conditions have worsened, that is, have deteriorated to a worse state than existed at the time the previous braking cycle was initiated. With brake-applying pressure increasing, wheel-slip is apt to recur to cause the wheel-slip detector 1 to react thereto for initiating a successive cycle of operation of the anti-wheel slide apparatus. In this instance, however, due to the greater road surface deterioration, the wheel-slip detector 1 reacts in a shorter time than in the first instance to effect operation of the differential piston-valve device 4, in the manner above described, for effecting a reduction of effective brake-applying pressure until wheel-slip has again been neutralized. As a result of the lesser time for response, build-up of pressure in chamber 23 of brake cylinder device 25 attains a lesser value, designated $P_{B3}$ in FIG. 2, than was attained in the first instance ($P_{B1}$), and reduction of pressure in chamber 27 of said brake cylinder device is terminated at a value, designated $P_{G3}$ in FIG. 2, greater than $P_o$, before reduction of brake-applying pressure is effected again.

The subsequent cycle of operation of the anti-wheel slide apparatus differs from the previously described cycle only to the extent that the resulting opposing pressures, designated $P_{B4}$ and $P_{G4}$, respectively, in FIG. 2, acting on the piston assembly 6 are lower than pressure $P_{B2}$ and higher than pressure $P_{G2}$, respectively. As a consequence, the resulting effective braking pressure, designated as $P_{B4}-P_{G4}$ in FIG. 2, corresponding to the deteriorated road surface conditions, is lower than the previous pressure $P_{B2}-P_{G2}$, thus permitting the wheel to resume normal rotation.

As a rule the road conditions remain essentially constant during a give period of braking operation. In any case, the anti-wheel slide apparatus produces an effective differential braking pressure at the onset of each cycle of operation, which braking pressure is determinative for establishing the critical degree of wheel-slip short of wheel-slide and to which the wheel-slip detector 1 responds for the existing road condition.

Spring 45, acting on smaller piston 30 of the piston assembly 6, is of such predetermined compression rating that for extremely low braking pressure, which triggers the wheel-slip detector 1 if the road surface is in very bad condition, there should be no residual effective braking pressure remaining in the brake cylinder device 25 after shifting of valve assembly 5 to its pressure-reducing position. This state is achieved if the counterpressure built up in chamber 38 of the piston-valve device 4, together with the low value of pressure in chamber 34, is not sufficient to overcome the force of spring 45, and as a result thereof, with valve assembly 5 remaining in its pressure-reducing position and, therefore, chambers 11 and 12 communicating with each other, the pressures on both sides of piston 24 of the brake cylinder device 25 equalize. Resumption of normal wheel rotation is thus achieved without any hindrance.

Figure 3:
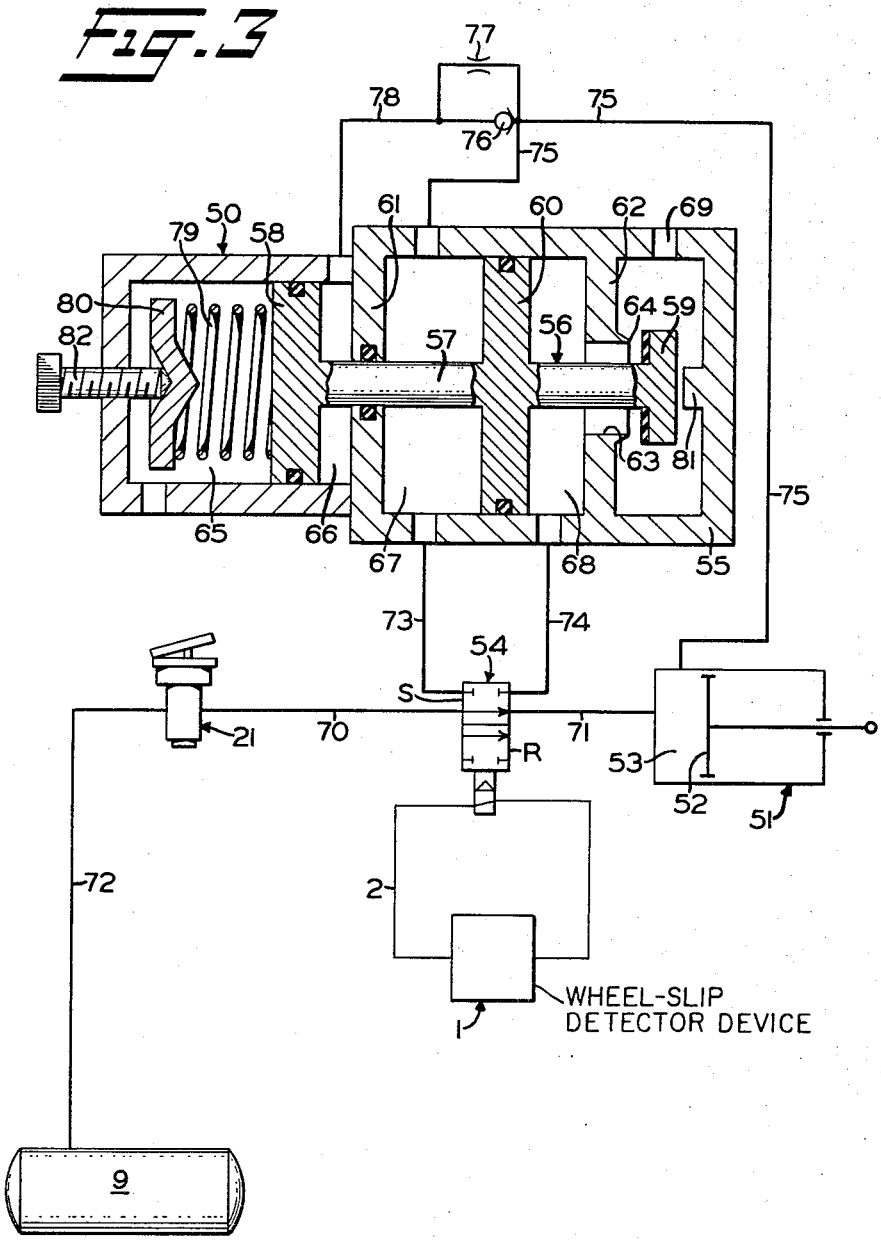
FIG. 3 is a schematic view, with a modified differential piston-valve device shown in section, of the apparatus embodying the invention.

The anti-wheel slide apparatus shown in FIG. 3 comprises a modified differential piston-valve device 50 which makes the apparatus adaptable to a single-acting brake cylinder device 51 having a piston 52 subjectable to fluid pressure in a pressure chamber 53. Any components of the apparatus shown in FIG. 3 identical with components of the apparatus shown in FIG. 1 are assigned identical reference numerals.

The apparatus shown in FIG. 3 also includes the wheel-slip detector device 1 for operating a magnet valve device 54 through the electrical circuit 2. The piston-valve device 50 comprises a casing 55 for housing a differential piston-valve assembly 56, said piston-valve assembly comprising a common piston rod or shaft 57 having a smaller piston 58 concentrically fixed at one end thereof and a pressure-reducing valve 59 at the opposite end, with a larger piston 60 axially spaced on said piston rod between said smaller piston and said pressure-reducing valve. The portion of piston rod 57 between the pistons 58 and 60 is sealingly and slidably operable through a separating wall 61 of the casing 55. A partitioning wall 62 is provided with a concentric bore 63 through which the portion of piston rod 57 between larger piston 60 and reducing valve 59 is reciprocably operable, said bore being of such diameter as to provide radial space between the bore and said piston rod and having an annular valve seat 64 surrounding the opening thereof on the side adjacent said reducing valve. The casing 55, in cooperation with smaller piston 58, separating wall 61, larger piston 60, and partitioning wall 62, has formed therein respective cylinder chambers 65, 66, 67 and 68, the latter being open to atmosphere, via a passageway or atmospheric port 69 formed in said casing, when valve 59 is in an unseated position relative to valve seat 64.

When magnet valve 54 is deenergized, said valve occupies a supply position in which a pipe 70 from brake valve device 21 is communicated to chamber 53 of the brake cylinder device 51 via a pipe 71, said brake valve device being connected to reservoir 9 via a pipe 72. The supply position of magnet valve 54 is diagrammatically illustrated in FIG. 3 and designated by the reference character S. Energization of magnet valve 54 effects operation thereof from its supply position to a pressure-reducing position in which communication between pipes 70 and 71 is cut off, and chambers 67 and 68 are communicated with each other via respective pipes 73 and 74, said pressure-reducing position being diagrammatically illustrated as position R in FIG. 3.

Chamber 53 of brake cylinder device 51 is connected via a pipe 75 to chamber 67 of piston valve device 50 and, through a one-way check valve 76 and a choke 77 in parallel relation to the check valve, to chamber 66 via a pipe 78 branching from pipe 75 and in which the check valve and choke are interposed, the direction of flow through the check valve being from pipe 75 toward pipe 78. A spring 79 compressed between a spring seat 80 and the outer face of piston 58 opposite chamber 66, serves to bias the piston-valve assembly 56 in a right-hand direction toward a normal position in which reducing valve 59 is in its unseated position, above defined, and in abutting contact with an internal projection 81 on the right-hand end wall of casing 55. The compression of spring 79 is adjustable in conventional manner by an adjusting screw 82 having its free end in contact with the spring seat 80.

Operation of the apparatus shown in FIG. 3 will be described with reference to the graphical diagram shown in FIG. 4, which also is a time-pressure relationship similar to the diagram shown in FIG. 2.

It will be assumed that the piston-valve assembly 56 is in its normal position and that brake valve 21, in similar fashion as with the apparatus shown in FIG. 1, is actuated to effect supply of fluid under pressure from reservoir 9 via pipes 72, 70, and 71 to chamber 53 of the brake cylinder device 51, whereupon a brake application is established. Simultaneously, fluid under pressure is also supplied via pipes 75 to cylinder chamber 67 and, without restriction, through check valve 76 and pipe 78 into cylinder chamber 66. Due to the larger effective area of larger piston 60 adjacent chamber 67 as compared to the effective area of smaller piston 58 adjacent chamber 66, piston-valve assembly 56 is maintained in its normal position, above defined.

As graphically shown in FIG. 4, braking pressure, designated $P_B$ in FIG. 4, in brake cylinder 51, chamber 66, and chamber 67 increases according to a curve from $P_o$ up to a critical limiting value $P_{B1}$ which corresponds to the degree of wheel-slip just short of wheel-slide. In response to the critical degree of wheel-slip, the wheel-slip detector 1 effects operation of magnet valve device 54 from supply position S to the pressure-reducing position R to cut off supply of fluid under pressure to the brake cylinder 51. While fluid under pressure equivalent to $P_{B1}-P_o$ prevails in chamber 66, fluid under pressure in chamber 67 may flow therefrom to atmosphere through pipe 73, magnet valve 54 (now in position R), pipe 74, chamber 68, past open valve 59, and port 69. As a result, fluid pressure in the brake cylinder device, by way of pipe 75, chamber 67, etc., is also reduced to a value or degree at which the forces acting on the piston-valve assembly assume a state of balance, so that said piston-valve assembly assumes a closed position in which valve 59 is seated on valve seat 64. In the meantime, the effective braking pressure has reduced from $P_{B1}$ (substantially equivalent to the pressure prevailing in chamber 66) to a value designated $P_{B2}$ in FIG. 4, or a differential pressure designated as $P_{B2}-P_{oa}$. This new effective braking pressure, $P_{B2}$, is maintained at the lower value for a period of time such that the wheel may resume normal rotation, and the wheel-slip detector 1, in response thereto, effects restoration of the magnet valve device 54 to its supply position S in which fluid pressure commences to build up again in brake cylinder device 51.

Assuming a further deterioration of road surface conditions, the wheel-slip detector 1 reacts accordingly to commence a new cycle of operation, in which the process above described is repeated, the only difference being that braking pressure now increases to a value designated $P_{B3}$ and shown by a new curve in FIG. 4. The new effective braking pressure may now be expressed as $P_{B3}-P_o$ on the graph in FIG. 4. Since this new supply pressure is again stored in chamber 66, the effective braking pressure, subsequently to operation of the wheel-slip detector 1, reduces to a correspondingly lower level $P_{B4}$ which may be expressed as $P_{B4}-P_o$. The new effective braking pressure $P_{B4}-P_o$ thus corresponds to the deteriorated road surface conditions and is low enough to permit the wheel to resume normal rotation.

Having now described the invention, what we claim as new and desire to secure by Letters Patent, is:

1. Apparatus for preventing sliding of a vehicle wheel during braking thereof, said apparatus comprising:
    a. a source of fluid under pressure;
    b. first means responsive to fluid pressure for effecting a brake application on the wheel;
    c. second means for effecting supply of fluid braking pressure from said source to said first means; and
    wherein the improvement comprises:
    d. third means cyclically operable responsively to wheel-slip at a critical degree short of a locked condition of the wheel for effecting a reduction of braking pressure and, after a certain time interval, restoration of the braking pressure, said third means being characterized in that the degree of reduction of braking pressure is a function of the degree of braking pressure effective at the moment of occurrence of said critical degree of wheel-slip such that the degree of braking pressure reduction for a high effective braking pressure is less than the degree of braking pressure reduction for a lower effective braking pressure.

2. Apparatus according to claim 1 further characterized by chamber means wherein the effective braking pressure determining the amount of braking pressure reduction is stored during each cycle of operation.

3. Apparatus according to claim 2 further characterized by build-up of a counterpressure acting in opposition to the stored braking pressure for effecting said reduction of the braking pressure effect.

4. Apparatus as set forth in claim 1 wherein said third means comprises:
   a. a fluid pressure operable differential piston-valve device interposed between said first and second means; and
   b. a wheel-slip detector operable responsively to said critical degree of wheel-slip to a supply position for effecting supply of fluid pressure from said source to said piston-valve device;
   c. said differential piston-valve device comprising:
      i. a valve assembly having a supply position, in which fluid under pressure may flow from said first means to said second means, and being operable in response to fluid pressure supply effected by said wheel-slip detector, to a pressure-reducing position in which reduction of said braking pressure is effected, and
      ii. a differential piston assembly having a pair of differential pistons spaced apart on a common shaft, the smaller of said pistons being subject on one side to said stored braking pressure in both the supply and pressure-reducing positions of the valve assembly, and the larger of said pistons being subject on one side, in the supply position of the valve assembly, to pressure equivalent and in opposing relation to the stored braking pressure acting on the smaller piston, for effecting movement of the piston assembly to a retracted position in which said valve assembly may be operated to its said pressure-reducing position, and being subject on the opposite side, in the pressure-reducing position of the valve assembly, to braking pressure supplied thereto from said first means and from said one side of the larger piston for establishing a pressure differential in the ratio of the effective pressure areas of the two pistons,
      iii. said piston assembly being operable, in response to and upon lapse of a certain time interval required for establishing said pressure differential at a degree corresponding to the amount of braking pressure reduction, to an extended position in which said valve assembly is restored to its said supply position.

5. Apparatus, as set forth in claim 4, wherein said first means comprises a double-acting brake cylinder device including a piston member subject on one side to braking pressure effected by said second means and further characterized in that the opposite sides of said piston member and the opposite sides of said larger piston are interconnected in the pressure-reducing position of said valve assembly to establish a counter-pressure on the opposite side of said piston member and on the opposite side of larger piston to effect said braking pressure reduction and said pressure differential, respectively.

6. Apparatus according to claim 5 further characterized in that, during braking pressure reduction, the side of the smaller piston opposite its said one side is subject to said counterpressure for counteracting said stored pressure acting on said one side thereof.

7. Apparatus according to claim 6 further characterized by choke means for effecting gradual build-up of said counterpressure acting on said side of said smaller piston opposite its said one side.

8. Apparatus according to claim 4 further characterized by spring means acting in opposition to said stored braking pressure for biasing said piston assembly toward its said retracted position.

9. Apparatus according to claim 8 further characterized by means for adjusting the compression of said spring means.

10. Apparatus according to claim 4 wherein said valve assembly is in the form of a spool valve having a supply valve and a reducing valve, said valve assembly and said piston assembly being housed in a common casing as a unit comprising said differential piston-valve device.

* * * * *